June 2, 1942. M. A. McCREARY Re. 22,106

PUNCH PRESS FOR FORMING SHEET METAL SHELLS

Original Filed Nov. 2, 1931 2 Sheets-Sheet 1

June 2, 1942. M. A. McCREARY Re. 22,106

PUNCH PRESS FOR FORMING SHEET METAL SHELLS

Original Filed Nov. 2, 1931 2 Sheets-Sheet 2

Inventor:
Miller A. McCreary
By Geo. U. Wadsworth Atty.

Reissued June 2, 1942

Re. 22,106

UNITED STATES PATENT OFFICE 22,106

PUNCH PRESS FOR FORMING SHEET METAL SHELLS

Miller A. McCreary, Danville, Ill., assignor to The Hegeler Zinc Company, Danville, Ill., a corporation of Illinois Original No. 1,935,854, dated November 21, 1933, Serial No. 572,645, November 2, 1931. Application for reissue April 21, 1939, Serial No. 269,292

21 Claims. (Cl. 113—38)

This invention relates to punch presses designed and adapted for forming or drawing sheet metal shells, comprising a plurality of sets or series of co-operating dies and punches adapted for simultaneous operation and arranged to act in succession on blanks delivered thereto, to progressively draw or deform the same from the initial blanks to the finished shells, whereby a completed shell will be produced at each stamping operation.

A principal object of the invention is to provide a punch press for the purpose specified, in which the dies and punches are arranged in separate sets, each operating on a separate blank in a different stage of deformation, all of the punches being operatively connected so as to work together, thereby producing a completed shell at each stamping or punching operation.

A further object of the invention is to provide a machine for the purpose specified, in which the work will always be visible and readily accessible, thus permitting the operator to detect and remove defective shells, or shells which may become jammed in the dies in the operation of the machine.

Still a further object of the invention is to provide a machine for the purpose specified, in which the dies are so arranged that, after each punching operation, blanks in process may be delivered from one set of dies and punches to the next succeeding set, and which, preferably, comprises transfer or feeding means for delivering blanks in process from each set of dies and punches to the next succeeding set.

Still a further object of the invention is to provide improved means for supporting and simultaneously operating the punches.

To effect the objects thereof, a punch press embodying my invention and improvements, comprises the various features, combinations of features and details of construction hereinafter described and claimed.

In the accompanying drawings in which the invention is fully illustrated,

Figure 3 is a fragmentary view of the blank transfer mechanism substantially from the position 3—3 of Figure 1.

Figure 1:
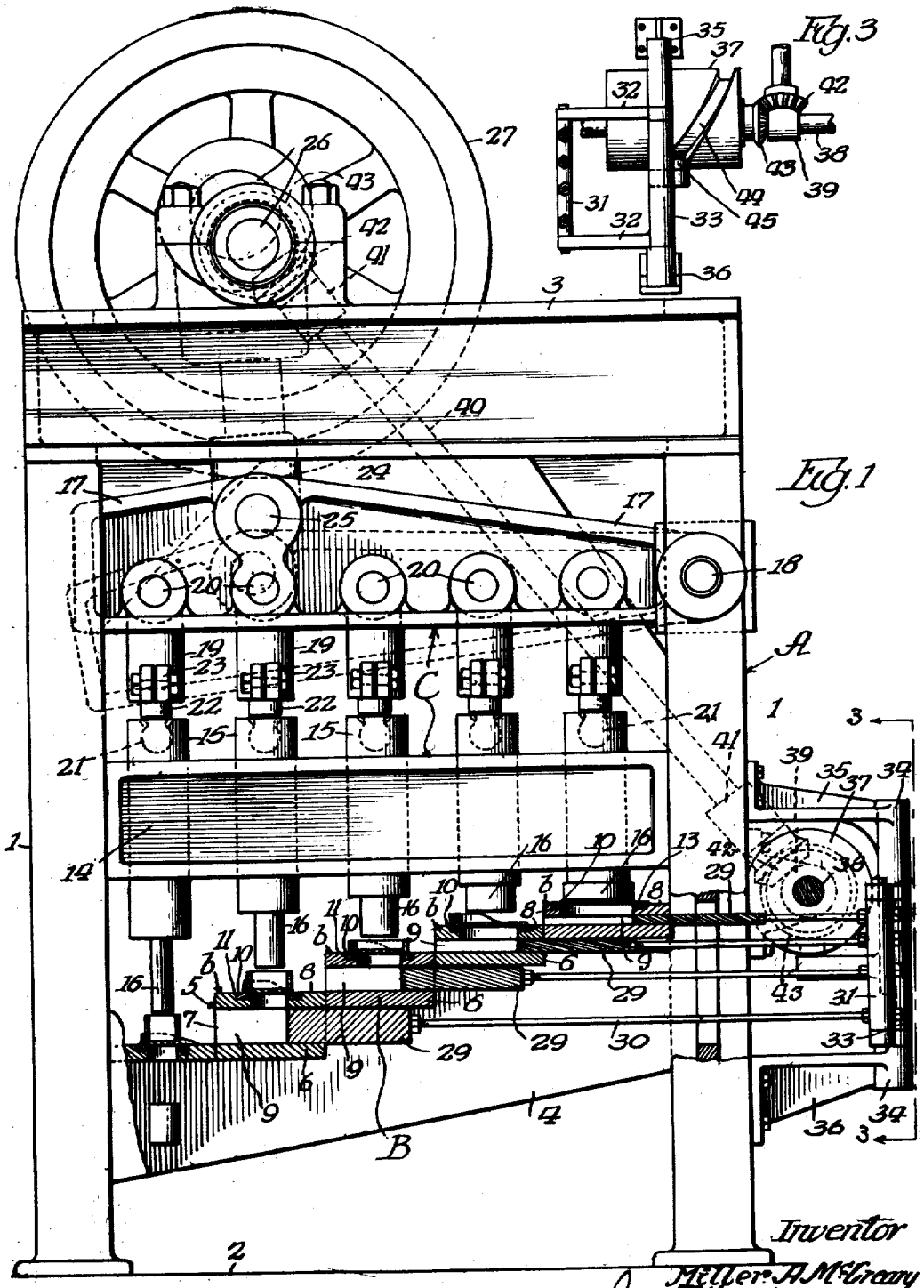
Figure 1 is a side view, partly in section, of what I now consider a preferable form of punch press embodying my invention and improvements.

Describing the invention with reference to the drawings and referring particularly to Figure 1, in the first instance, in which I have shown what I now consider a preferable form of punch press embodying my invention and improvements, A designates the frame of the machine as a whole, B the die assembly as a whole, and C the punch assembly as a whole.

The frame A comprises posts or pillars 1, the lower ends of which rest upon a suitable base or foundation, the line of which is indicated at 2. Said frame also comprises a box structure 3 connected to and which rigidly connects the upper ends of said posts or pillars 1.

As shown, the die assembly B is supported on spaced members 4 which form part of the machine frame, and comprises a plurality of separate die units *b* secured to the supporting members 4 in spaced relation to each other and at successively lower levels, from the initial to the final die.

As shown, each of the die units *b* consists of a hollow die-block 5 comprising a bottom plate 6, side plates 7 and a top or bolster plate 8, rigidly secured together to form a unitary structure and which, preferably are cast integral with each other. The openings 9 in the die-blocks 5 are proportioned to receive the stampings formed by said dies, respectively, with sufficient clearance to permit said stampings to move freely therein to provide for delivering said stampings to a succeeding die after each stamping operation.

The dies 10 are secured in recesses 11 formed in the bolster plates 8, with the top surfaces in or slightly below the planes of the top surfaces of the bolster plates 8, respectively, and to provide for aligning the dies with the punches and the punch assembly, presently described, the die-blocks are secured to the frame members 4 so as to be adjustable in all directions, simple means for this purpose consisting of clamping screws which have threaded engagement with holes formed in the frame members 4 and which extend through holes formed in the die-blocks 5, said holes being larger than the shanks of the screws—say one-eighth inch (⅛").

As shown, the die-blocks 5 are supported in such relation to each other that the upper surfaces of the bottom plate of one die-block and of the top or bolster plate of the adjacent succeeding die-block will be in the same plane. Also, said die-blocks are made of such length that the ends of adjacent die-blocks will abut against each other, thus providing continuous supporting surfaces along which blanks, in process, discharged from one die may be delivered in operative position to the adjacent succeeding die, the position of the blanks relative to the die openings, being defined by suitable stops arranged to position the blanks concentric, as near as may be, with the die opening.

As shown, the initial die 10 is a blanking die adapted for stamping blanks from a thin sheet of metal shown at 13, which may be fed endwise transversely of said die assembly with a step-by-step motion during the intervals between successive punching or drawing operations. If desired, however, my invention contemplates equally forming the blanks as a separate operation, and feeding them to the machine either by hand or by mechanical means provided for the purpose.

The dies 10 are provided, respectively, with holes or openings of successively smaller diameters, the variation in the size thereof depending upon the number of drawing or deforming operations to which the blanks are subjected, the size of the final die opening conforming to the contemplated outside diameter of the finished article.

As shown, also, the punch assembly C is mounted above and in co-operating relation to the die assembly B and comprises a fixed guide frame 14, mounted in bearings in which are plungers 15 secured to the lower ends of which are punches 16, each of said punches, excepting the blanking punch being sufficiently smaller than its die opening to provide clearance between said punches and their respective die openings to subject the blanks operated upon thereby to contemplated drawing action, which will operate, in a usual manner, to elongate said blanks and reduce their outside diameters.

In operation, reciprocating movement is adapted to be imparted to the plungers 15 by means of suitable connection between their upper ends and a member 17 pivoted at 18 to the frame of the machine, the connection between said plungers and the member 17 comprising links 19 pivoted to the member 17 by means of rods 20, said links being connected to said plungers by means of ball and socket joints 21 which, as shown, are formed at the lower ends of rods 22 adjustably secured to the links 19 by clamps 23 formed at the lower ends of said rods or links, as shown. The ball joint connections will operate, in an obvious manner, to relieve the plungers 15 from all tendency to bind in their bearings, due to the pivotal movement of the member 17.

In operation, oscillation is imparted to the member 17 by a pitman rod 24 which pivotally connects a pin 25 secured therein with a crank shaft 26 rotatably mounted in journal boxes secured to the top of the box member 3 of the machine frame and adapted to be driven by a belt, not shown, applied to a pulley 27 on said shaft.

Due to the fact that the blanks in process are elongated by each successive punching or drawing operations, it is obvious that the axial drawing movement of the different punches will increase progressively from the initial to the final punch, and a particular advantage of the construction in which the punches are actuated by the pivoted member 17 is that desired differential movement may be imparted to the different punches by connecting them to said pivoted member at different distances from its pivoted end, corresponding to contemplated axial movement thereof, respectively, whereby each punch will be moved through arcs of different lengths corresponding to predetermined axial movement of said punches, respectively. Since the punches are all mounted on the member 17 at progressively increasing distances from its pivot 18, their strokes, i. e., movements in the direction of the dies, are of different lengths and at different speeds, the distance or length of travel and speed increasing with the distance of the respective punches from the pivot. Thus, the working movements or strokes of all the punches are simultaneous, i. e., commence and terminate at the same time, respectively, with the result that, although their paths of travel are of different lengths, this is compensated for by the increased speed of travel as the length of movement increases and the different punches thereby initiate and complete their stroke movements simultaneously.

In the preferable construction shown, my improved punch press comprises means for transferring the blanks in process from one die to the adjacent succeeding die, whereby the operation of the machine is rendered automatic so that it may run continuously.

As shown, said transfer means comprise push blocks 29, slidable in the openings 9 in the die supporting block 5, said push blocks being secured to the ends of rods 30, the opposite ends of which are secured to an upright bar 31 pivoted at the ends of arms 32 formed on a frame member 33 pivotally mounted between the ends of hubs or bosses 34 formed on brackets 35 and 36 secured to the adjacent post or pillar 1 of the machine frame. In operation, oscillating movement is adapted to be imparted to the frame member 33, thereby imparting reciprocating movement to the rods 30 and the push blocks 29 by a cam 37 secured to rotate with a shaft 38 rotatably mounted in brackets 39 secured to the adjacent frame post or pillar 1, rotation in operation being imparted to said cam shaft and cam by driving connection with the crank shaft 26 consisting, as shown, of a shaft 40 rotatably mounted in bearing bosses 41 on the machine frame, bevel gears 42 on which mesh with bevel gears 43 secured to the crank shaft 26 and to the cam shaft 38, respectively. Formed in the surface of the cam 37 is a cam groove 44 which is engaged by a roller stud 45 mounted at the end of an arm on the frame member 33, the relation being such that rotation of said cam will impart oscillating movement to said member 33 and through it, reciprocating movement to the rods 30 and push blocks 29.

Instead of the punch assembly C shown in Figure 1 and heretofore described, I contemplate, as a modification of the invention, a construction in which the punch assembly comprises a cross-head mounted to reciprocate in bearings formed on the posts or pillars of the press frame, to which reciprocating movement is imparted in operation by pitman rods, an end of each of which is pivoted to said cross-head and their opposite ends to cranks on a crank shaft mounted to rotate in bearings in members of the machine frame, the plungers in which the punches are secured, being rigidly attached to said cross-head and the lengths thereof being proportioned so as to impart contemplated movement to the punches in operation.

Figure 2:
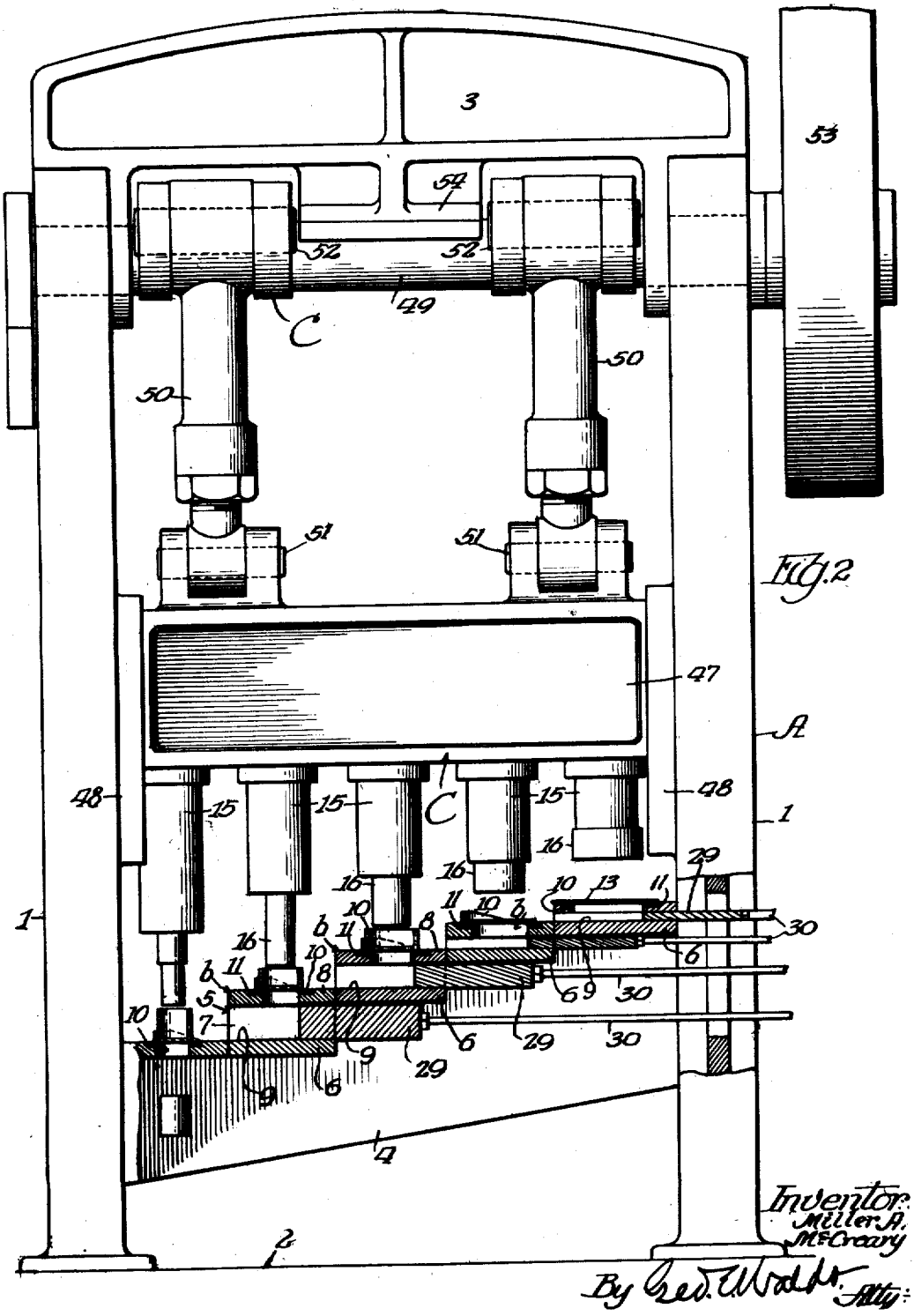
Figure 2 is a view substantially similar to Figure 1, showing modified means for supporting and actuating the punches, in operation.

This modification is shown in Figure 2 of the drawings and will now be described. As regards features which are the same or substantially so, as corresponding parts of the press shown in Figure 1, said parts are designated by the same reference characters in both figures and will be readily understood from an inspection of the drawings without a separate description thereof in detail.

In the punch assembly C, 47 is the cross-head to which the punches 16 are secured, the ends of said cross-head being slidably fitted to bearings 48 on the posts or pillars 1 of the press, and reciprocating movement is adapted to be imparted thereto by suitable connection between said cross-head, and a shaft 49, consisting, as shown, of pitman rods 50, the lower ends of which are pivotally connected to said cross-head by pins 51 and formed in the upper ends of which are bearings fitted to crank pins 52 on the crank shaft 49. The crank shaft is driven from a suitable source of power by means of a belt, not shown, applied to a driving pulley 53 secured to said crank shaft.

As shown, the thrust sustained by the crank shaft 49, due to the operation of the punches 15, is absorbed by a segmental thrust bearing indicated at 54, secured to the frame member 3 which connects the upper ends of the posts or pillars 1 of the frame of the machine, to which the top side of the crank shaft is fitted.

Within the scope and contemplation of the invention, a punch press embodying my invention and improvements may be equipped with usual accessory devices, such as pressure blank holders maintained yielding under desired operating tension by compressed air or steel or rubber spring; or special stripping devices; or knockouts, which the character of the work to be performed may require. Such devices are old and well known and can readily be supplied by mechanics skilled in the art without the exercise of invention and need not, therefore, be shown or described in detail.

I claim:

1. In a punch press for subjecting sheet metal blanks to successive drawing operations, the combination of a frame and correlated punch and die assemblies mounted therein, the die assembly comprising a plurality of separate, fixed dies, and means for supporting said dies in spaced relation to each other and at successively lower levels from the initial to the final die, means defining passageways beneath said dies arranged to receive blanks in process therefrom, respectively, proportioned to permit blanks delivered thereto to move freely therealong, the bottoms of said passageways forming continuous supporting surfaces along which blanks are delivered from one die to the adjacent succeeding die, and the relation being such that at each drawing operation the blanks will be forced entirely through the dies to which they are successively presented.

2. The combination specified in claim 1, in which the die supporting means comprises plates provided in their top surfaces with recesses to receive said dies with the top surfaces of said plates and dies flush with each other.

3. The combination specified in claim 1, which comprises guide stops arranged to position blanks in process relative to the different dies.

4. The combination specified in claim 1, in which the punch assembly comprises plungers to which different punches are secured, means for supporting and guiding said plungers, and means for simultaneously reciprocating the same.

5. The combination specified in claim 1, in which the punch assembly comprises plungers to which different punches are secured, a fixed guide-frame supported on the machine frame provided with bearings in which said plungers are mounted to reciprocate, an actuating member pivoted at one end to the machine frame, means flexibly connecting the punch supporting plungers with said pivoted member at different distances from its pivot, and means for oscillating said member.

6. The combination specified in claim 1, in which the punch assembly comprises plungers to which different punches are secured, a fixed guide-frame supported on the machine frame provided with bearings in which said plungers reciprocate, an actuating member pivoted at one end to the machine frame, means flexibly connecting the punch supporting plungers with said pivoted member at different distances from its pivot, comprising links pivoted to said pivoted member, ball and socket joints connecting said links with said plungers, and means for oscillating said member.

7. In a punch press for subjecting sheet metal blanks to successive drawing operations, the combination of a frame, correlated punch and die assemblies comprising a plurality of punches and dies supported on said frame in spaced relation to each other, respectively, the punch assembly comprising plungers to which different punches are secured, and means for simultaneously imparting reciprocating strokes of different lengths to said plungers and punches.

8. The combination specified in claim 7, in which the means for reciprocating said plungers and punches comprises a member pivoted to the frame, means flexibly connecting said plungers to said pivoted member at different distances from its pivot, and means for oscillating said pivoted member.

9. The combination specified in claim 1, in which the die supporting means comprises die blocks provided with passageways proportioned to receive blanks in process from said dies, respectively, the top surfaces of said die blocks being provided with recesses to receive said dies with the top surfaces of said dies and die blocks flush with each other, and the bottoms of the passageways in said die blocks being flush with the top surfaces of adjacent succeeding die blocks, respectively, providing a continuous supporting surface along which blanks in process may be delivered from one die to the adjacent succeeding die.

10. The combination specified in claim 1, which also comprises means for transferring blanks in process from said dies, respectively, to the next succeeding die.

11. The combination specified in claim 1, which also comprises means for transferring blanks in process from said dies, respectively, to the adjacent succeeding die, and stops for positioning said blanks relative to the dies to which they are transferred.

12. The combination specified in claim 1, which also comprises push means for transferring blanks in process from said dies, respectively, to the next succeeding die, and means for reciprocating the same.

13. The combination specified in claim 1, which also comprises means for transferring blanks in process from said dies, respectively, to the adjacent succeeding die, comprising push blocks, an oscillating frame, rods which connect said blocks with said frame, and means for imparting oscillating movement to said frame to reciprocate said rods.

14. In a punch press for subjecting sheet metal blanks to successive drawing operations adapted to progressively form from each blank a cup of increasing depth and decreasing diameter, the combination of a frame, correlated punch and die assemblies comprising a plurality of punches and dies supported on said frame in spaced relation to each other, respectively, the punch assembly comprising plungers to which different punches are secured, the die assembly comprising a plurality of dies, means for supporting said dies at successively lower levels from the initial to the final die, reciprocating means for transferring work from one punch and die assembly to another, and means for simultaneously imparting reciprocating strokes of different lengths to said plungers and punches.

15. In a punch press for subjecting sheet metal blanks to successive drawing operations adapted to progressively form from each blank a cup of increasing depth and decreasing diameter, the combination of a frame, correlated punch and die assemblies comprising a plurality of punches and dies supported on said frame in spaced relation to each other respectively, the punch assembly comprising plungers to which different punches are secured, the die assembly comprising fixed dies into which the cups are drawn by the punches, reciprocating means for moving the cups in process of formation continuously along a predetermined path from one die to the next succeeding die, and means for simultaneously imparting reciprocating strokes of different lengths to said plungers and punches.

16. In a punch for subjecting sheet metal blanks to successive drawing operations adapted to progressively form from each blank a cup of increasing depth and decreasing diameter, the combination of a frame and correlated punch and die assemblies mounted therein, the die assembly comprising a plurality of separate fixed dies, means for supporting said dies in spaced relation to each other and at successively lower levels from the initial to the final die, means defining passageways beneath said dies arranged to receive blanks in process therefrom, respectively, proportioned to permit blanks delivered thereto to move freely therealong, the bottoms of said passageways forming continuous supporting surfaces along which blanks are delivered from one die to the adjacent succeeding die, and the relation being such that at each drawing operation the blanks will be forced entirely through the dies to which they are successively presented, the punch assembly comprising plungers to which different punches are secured, and means for simultaneously imparting reciprocating strokes of different lengths to said plungers and punches.

17. In a punch press for subjecting sheet metal blanks to successive drawing operations adapted to progressively form from each blank a cup of increasing depth and decreasing diameter, the combination of a frame and correlated punch and die assemblies mounted therein, the die assembly comprising a plurality of separate fixed dies, means for supporting said dies in spaced relation to each other and at successively lower levels from the initial to the final die, means defining passageways beneath said dies arranged to receive blanks in process therefrom, respectively, proportioned to permit blanks delivered thereto to move freely therealong, the bottoms of said passageways forming continuous supporting surfaces along which blanks are delivered from one die to the adjacent succeeding die, and the relation being such that at each drawing operation the blanks will be forced entirely through the dies to which they are successively presented, means for transferring the blanks in process from one die to a succeeding die, the punch assembly comprising plungers to which different punches are secured, and means for simultaneously imparting reciprocating strokes of different lengths to said plungers and punches.

18. In a punch press for subjecting sheet metal blanks to successive drawing operations adapted to progressively draw each blank into a cup of increasing depth and decreasing diameter, the combination of a frame, correlated punch and die assemblies comprising a plurality of punches and dies supported on said frame in spaced relation to each other, respectively, the punch assembly comprising plungers to which different punches are secured, the die assembly comprising a plurality of dies, means for transferring the cups simultaneously from each drawing instrumentality directly to the succeeding drawing instrumentalities while the punches are out of working position, and means for simultaneously imparting reciprocating strokes of different lengths to said plungers and punches and for causing the same to act simultaneously upon the cups to successively draw the same.

19. In a punch press for subjecting sheet metal blanks to successive drawing operations, the combination of a frame, correlated punch and die assemblies comprising a plurality of punches and dies supported on said frame in spaced relation to each other, respectively, the punch assembly comprising plungers to which different punches are secured, and means for simultaneously imparting reciprocating strokes of different lengths and different speeds to said plungers and punches.

20. In a punch press for subjecting sheet metal blanks to successive drawing operations, the combination of a frame, correlated punch and die assemblies comprising a plurality of punches and dies supported on said frame in spaced relation to each other, respectively, the punch assembly comprising plungers to which different punches are secured, and means for simultaneously imparting reciprocating strokes of different lengths and different speeds to said plungers and punches, the strokes increasing in length and velocity for succeeding forming operations.

21. In a punch press for subjecting sheet metal blanks to successive drawing operations to progressively form from each blank a cup of increasing depth and decreasing diameter, the combination of a frame, correlated punch and die assemblies comprising a plurality of punches and dies supported on said frame in spaced relation to each other, respectively, the punch assembly comprising plungers to which different punches are secured, means for simultaneously imparting reciprocating strokes of different lengths and different speeds to said plungers and punches, and reciprocating means for transferring work from one punch and die assembly to another without interruption for each punching movement of the plungers.

MILLER A. McCREARY.